(12) United States Patent
Thackeray et al.

(10) Patent No.: US 10,305,103 B2
(45) Date of Patent: May 28, 2019

(54) STABILIZED ELECTRODES FOR LITHIUM BATTERIES

(71) Applicant: UCHICAGO ARGONNE, LLC, Chicago, IL (US)

(72) Inventors: Michael M. Thackeray, Naperville, IL (US); Jason Croy, Plainfield, IL (US); Khalil Amine, Oak Brook, IL (US); Bryan T. Yonemoto, Westmont, IL (US); Joong Sun Park, Woodridge, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 269 days.

(21) Appl. No.: 15/232,188

(22) Filed: Aug. 9, 2016

(65) Prior Publication Data
US 2017/0047587 A1  Feb. 16, 2017

Related U.S. Application Data

(60) Provisional application No. 62/203,562, filed on Aug. 11, 2015.

(51) Int. Cl.
*H01M 4/50* (2010.01)
*H01M 4/505* (2010.01)
(Continued)

(52) U.S. Cl.
CPC ........... *H01M 4/505* (2013.01); *H01M 4/364* (2013.01); *H01M 4/525* (2013.01); *H01M 10/052* (2013.01); *H01M 2004/028* (2013.01)

(58) Field of Classification Search
None
See application file for complete search history.

(56) References Cited

U.S. PATENT DOCUMENTS 5,153,081 A  10/1992  Thackeray et al.
5,160,712 A  11/1992  Thackeray et al.
(Continued)

FOREIGN PATENT DOCUMENTS

WO  2012067675  5/2012

OTHER PUBLICATIONS

Amatucci, G. et al., Optimization of Insertion Compounds Such as LiMn2O4 for Li-Ion Batteries, Journal of the Electrochemical Society, 149 (12), K31-K46, (2002).
(Continued)

*Primary Examiner* — Daniel S Gatewood
(74) *Attorney, Agent, or Firm* — Olson & Cepuritis, Ltd.

(57) ABSTRACT

A structurally inhomogeneous lithium metal oxide material having the Formula (I): $y[xLi_2MO_3 \cdot (1-x)LiM'O_2] \cdot (1-y)Li_{1+d}M''_{2-d}O_4$; wherein $0 \leq x \leq 1$; $0 < y < 1$; $0 \leq d \leq 0.33$; and wherein the $Li_{1+d}M''_{2-d}O_4$ component comprises a spinel structure, and each of the $Li_2MO_3$ and the $LiM'_2$ components thereof comprise layered structures. Each of M, M', and M'' independently comprises one or more metal ions. The composition of the material of Formula (I) varies across the electrode particles by changing at least one of x, y, d, M, M' and M''. Electrodes, cells and batteries comprising the lithium metal oxide material are also described.

26 Claims, 10 Drawing Sheets

(51) Int. Cl.
| | |
|---|---|
| H01M 4/36 | (2006.01) |
| H01M 4/52 | (2010.01) |
| H01M 4/525 | (2010.01) |
| H01M 10/052 | (2010.01) |
| H01M 4/02 | (2006.01) |

(56) References Cited

U.S. PATENT DOCUMENTS

| | | |
|---|---|---|
| 5,316,877 A | 5/1994 | Thackeray et al. |
| 5,981,106 A | 11/1999 | Amine et al. |
| 6,482,374 B1 | 11/2002 | Kumar et al. |
| 6,555,269 B2 | 4/2003 | Cho et al. |
| 6,677,082 B2 | 1/2004 | Thackeray et al. |
| 6,680,143 B2 | 1/2004 | Thackeray et al. |
| 6,878,487 B2 | 4/2005 | Cho et al. |
| 6,916,580 B2 | 7/2005 | Cho et al. |
| 6,984,469 B2 | 1/2006 | Kweon et al. |
| 7,087,348 B2 | 8/2006 | Holman et al. |
| 7,138,209 B2 | 11/2006 | Kweon et al. |
| 7,303,840 B2 | 12/2007 | Thackeray et al. |
| 7,314,682 B2 | 1/2008 | Thackeray et al. |
| 7,384,664 B2 | 6/2008 | Oesten et al. |
| 7,445,871 B2 | 11/2008 | Suh et al. |
| 7,468,223 B2 | 12/2008 | Thackeray et al. |
| 7,635,536 B2 | 12/2009 | Johnson et al. |
| 7,790,308 B2 | 9/2010 | Johnson et al. |
| 7,927,506 B2 | 4/2011 | Park |
| 7,935,270 B2 | 5/2011 | Park |
| 8,080,340 B2* | 12/2011 | Thackeray ......... C01G 45/1221 429/128 |
| 8,808,912 B2 | 8/2014 | Thackeray et al. |
| 9,070,489 B2 | 6/2015 | Sharma et al. |
| 2001/0046628 A1 | 11/2001 | Oesten et al. |
| 2003/0108790 A1 | 6/2003 | Manthiram et al. |
| 2005/0026040 A1 | 2/2005 | Thackeray et al. |
| 2005/0153206 A1 | 7/2005 | Oesten et al. |
| 2006/0099508 A1* | 5/2006 | Thackeray ............ H01M 4/131 429/231.1 |
| 2006/0216605 A1 | 9/2006 | Shirakata et al. |
| 2009/0136839 A1 | 5/2009 | Kraznov et al. |
| 2009/0224212 A1 | 9/2009 | Manthiram et al. |
| 2010/0086853 A1 | 4/2010 | Venkatachalam et al. |
| 2010/0190058 A1 | 7/2010 | Thackeray et al. |
| 2010/0207577 A1 | 8/2010 | Sugiyama et al. |
| 2012/0263998 A1 | 10/2012 | Thackeray et al. |
| 2013/0078518 A1 | 3/2013 | Thackeray et al. |
| 2014/0127398 A1 | 5/2014 | Thackeray et al. |
| 2015/0180031 A1 | 6/2015 | Thackeray et al. |
| 2015/0180032 A1* | 6/2015 | Thackeray ............ H01M 4/505 429/149 |
| 2015/0318546 A1 | 11/2015 | Thackeray et al. |

OTHER PUBLICATIONS

Amine, K. et al., A New Three-Volt Spinel Li1+xMn1.5Ni0.5O4 for Secondary Lithium Batteries, Journal Electrochemical Society, vol. 143, (5), 1607-1613 (1996).

Arunkumar, T.A. et al., Influence of Lattice Parameter Differences on the Electrochemical Performance of the 5 V Spinel LiMn1.5-yNi0.5-zMy+zO4 (M=Li, Mg, Fe, Co, and Zn), Electrochemical and Solid State Letters, vol. 8, (8), A403-A405 (2005).

Belharouak, I. et al., Identification of LiNi0.5O4 Spinel in Layered Manganese Enriched Electrode Materials, Electrochemistry Communications 13, 232-236 (2011).

Cabana, J. et al., Structural and Electrochemical Characterization of Composite Layered-Spinel Electrodes Containing Ni and Mn for Li-Ion Batteries, Journal of The Electrochemical Society 156 (9), A730-A736 (2009).

Cabana, J. et al., Structural Complexity of Layered-Spinel Composite Electrodes for Li-Ion Batteries, J. Mater. Res. 25 (8), 1601-1616 (2010).

Chen, Z. et al., Effect of a ZrO2 Coating on the Structure and Electrochemistry of LixCoO2 When Cycled to 4.5 V, Electrochemical and Solid State Letters, 5 (10), A213-A216, (2002).

Cho, J. et al., Novel LiCoO2 Cathode Material with Al2O3 Coating for a Li Ion Cell, Chemistry of Materials 12, 3788-3791, (2000).

Cho, J. et al., High-Performance ZrO2-Coated LiNiO2 Cathode Material, Electrochemical and Solid-State Letters, 4 (10), A159-A161, (2001).

Choi, W. et al., Superior Capacity Retention Spinel Oxyfluoride Cathodes for Lithium-Ion Batteries, Electrochemical and Solid State Letters, 9 (5), A245-A248 (2006).

Croy, J. R., et al., Designing High-Capacity, Lithium-Ion Cathodes Using X-ray Absorption Spectroscopy, Chemistry of Materials 23, 5415-5424 (2011).

Croy, J. R. et al., Li2MnO3-Based Composite Cathodes for Lithium Batteries: A Novel Synthesis Approach and New Structures, Electrochemistry Communications 13, 1063-1066 (2011).

Gummow, R.J. et al., Improved Capacity Retention in Rechargeable 4 V Lithium/Lithium-Manganese Oxide (Spinel) Cells, Solid State Ionics 69, 59-67 (1994).

Gummow, R.J. et al., A Reinvestigation of the Structures of Lithium-Cobalt-Oxides With Neutron-Diffraction Data, Mat. Res. Bull. 28 (11), 1177-1184 (1993).

Gummow, R.J. et al., Spinel Versus Layered Structures for Lithium Cobalt Oxide Synthesised at 401° C, Mat. Res. Bull. 28 (3), 235-246 (1993).

Gummow, R.J. et al., Characterization of LT-LixCo1-yNiyO2 Electrodes for Rechargeable Lithium Cells, Journal of The Electrochemical Society 140 (12) 3365-3368 (1993).

Gummow, R.J. et al., Lithium-Cobalt-Nickel-Oxide Cathode Materials Prepared at 400° C for Rechargeable Lithium Batteries, Solid State Ionics 53-56, 681-687 (1992).

Gummow, R.J. et al., Structure and Electrochemistry of Lithium Cobalt Oxide Synthesised at 400° C, Mat. Res. Bull. 27 (3), 327-337 (1992).

Jafta, C.J. et al., Microwave-Assisted Synthesis of High-Voltage Nanostructured LiMn1.5Ni0.5O4 Spinel: Tuning the Mn3+ Content and Electrochemical Performance, ACS Applied Materials and Interfaces, vol. 5, 7592-7598 (2013).

Johnson, C.S. et al., Lithium-Manganese Oxide Electrodes with Layered-Spinel Composite Structures xLi2MnO3•(1-x)Li1+yMn2-yO4 (0 <x < 1, 0 ≤ y ≤ 0.33) for Lithium Batteries, Electrochemistry Communications 7, 528-536 (2005).

Johnson, C.S. et al., Anomalous Capacity and Cycling Stability of xLi2MnO3 • (1-x)LiMO2 Electrodes (M=Mn, Ni, Co) in Lithium Batteries at 50° C, Electrochemistry Communications 9, 787-795 (2007).

Johnson, C.S. et al., The Significance of the Li2MnO3 Component in 'Composite' xLi2MnO3.(1-x)LiMn0.5Ni0.5O2 Electrodes, Electrochemistry Communications 6, 1085-1091 (2004).

Kang, S.H. et al., Layered Li(Li0.2Ni0.15+0.5zCo0.10Mn0.55-0.5z)O2-zFz Cathode Materials for Li-ion Secondary Batteries, Journal of Power Sources 146, 654-657, (2005).

Kang, S.H. et al., Stabilization of xLi2MnO2.(1-x)LiMO2 Electrode Surfaces (M=Mn, Ni, Co) with Mildly Acidic, Fluorinated Solutions, Journal of The Electrochemical Society, 155 (4), A269-A275, (2008).

Kang, S.H. et al., The Effects of Acid Treatment on the Electrochemical Properties of 0.5 Li2MnO3.0.5 LiNi0.44Co0.25Mn0.31O2 Electrodes in Lithium Cells, Journal of The Electrochemical Society, 153 (6), A1186-A1192, (2006).

Kim, D. et al., Composite 'Layered-Layered-Spinel' Cathode Structures for Lithium-Ion Batteries, Journal of The Electrochemical Society 160 (1), A31-A38 (2013).

Kim, J.S. et al., The Electrochemical Stability of Spinel Electrodes Coated with ZrO2, Al2O3, and SiO2 From Colloidal Suspensions, Journal of The Electrochemical Society 151 (10), A1755-A1761 (2004).

Kim, J. et al., Electrochemical and Structural Properties of xLi2M'O3 • (1-x)LiMn0.5Ni0.5O2 Electrodes for Lithium Batteries (M' = Ti, Mn, Zr; 0≤ x ≤ 0.3), Chemical Materials 16, 1996-2006 (2004).

(56) References Cited

OTHER PUBLICATIONS

Kim, D. et al., High-Energy and High Power Li Rich Nickel Manganese Oxide Electrode Materials, Electrochemistry Communications 12, 1618-1621 (2010).

Kim, J. et al., Controlled Nanoparticle Metal Phosphates (Metal = Al, Fe, Ce, and Sr) Coatings on $LiCoO_2$ Cathode Materials, Journal of The Electrochemical Society 152 (6), A1142-A1148 (2005).

Kim, G.H., et al. Improvement of High-Voltage Cycling Behavior of Surface-Modified $Li[Ni_{1/3}Co_{1/3}Mn_{1/3}]O_2$ Cathodes by Fluorine Substitution for Li-Ion Batteries, Journal of The Electrochemical Society 152 (9), A1707-A1713, (2005).

Lee, E-S et al., Understanding the Effect of Synthesis Temperature on the Structural and Electrochemical Characteristics of Layered-Spinel Composite Cathodes for Lithium-Ion Batteries, Journal of Power Sources 240, 193-203 (2013).

Long, B.R. et al., Advances in Stabilizing 'Layered-Layered' $xLi_2MnO_3$ $(1-x)LiMO_2$ (M=Mn, Ni, Co) Electrodes with a Spinel Component, Journal of The Electrochemical Society 161 (14), A2160-A2167 (2014).

Nam, K-W et al., In Situ X-ray Diffraction Studies of Mixed $LiMn_2O_4$-$LiNi_{1/3}Co_{1/3}Mn_{1/3}O_2$ Composite Cathode in Li-Ion Cells During Charge-Discharge Cycling, Journal of Power Sources 192, 652-659 (2009).

Park, B.C. et al., Improvement of Structural and Electrochemical Properties of $AlF_3$-Coated $Li[Ni_{1/3}Co_{1/3}Mn_{1/3}]O_2$ Cathode Materials on High Voltage Region, Journal of Power Sources 178, 826-831 (2008).

Park, S-H. et al., Lithium-Manganese-Nickel-Oxide Electrodes with Integrated Layered-Spinel Structures for Lithium Batteries, Electrochemistry Communications 9, 262-268 (2007).

Sun, Y. K. et al., $AlF_3$-Coating to Improve High Voltage Cycling Performance of $Li[Ni_{1/3}Co_{1/3}Mn_{1/3}]O_2$ Cathode Materials for Lithium Secondary Batteries, Journal of The Electrochemical Society 154 (3), A168-A172 (2007).

Thackeray, M., The Need For New Lithium-Ion Battery Materials, The 25th International Battery Seminar & Exhibit, Fort Lauderdale, Florida, Mar. 2008.

Thackeray, M.M. et al., Integrated Electrode Structures for Lithium-Ion Batteries, International Workshop on Fundamentals of Lithium-Based Batteries, Schloss Ringberg, Tegernsee, Germany, Nov. 2008.

Thackeray, M.M. et al., Advances in Manganese-Oxide 'Composite' Electrodes for Lithium-Ion Batteries, Journal of Materials Chemistry 15, 2257-2267 (2005).

Thackeray, M.M., Structural Considerations of Layered and Spinel Lithiated Oxides for Lithium Ion Batteries, Journal of The Electrochemistry Society 142 (8), 2558-2563 (1995).

Thackeray, M.M. et al., $Li_2MnO_3$-Stablized $LiMO_2$ (M=Mn, Ni, Co) Electrodes for Lithium-Ion Batteries, Journal of Materials Chemistry 17, 3112-3125 (2007).

Van Der Ven, A. et al., Ordering in $Li_x(Ni_{0.5}Mn_{0.5})O_2$ and Its Relation to Charge Capacity and Electrochemical Behavior In Rechargeable Lithium Batteries, Electrochemistry Communications 6, 1045-1050 (2004).

Ward, R.M. et al., Olivine Composite Cathode Materials For Improved Lithium Ion Battery Performance, U.S. Department of Energy, Journal of Undergraduate Research, vol. 6 (91), 2006.

Winter et al., What are Batteries, Fuel Cells and Supercapacitors? Chemical Reviews 104, 4245-4269 (2004).

Wu, Y. et al., Surface Modification of High Capacity Layered $Li[Li_{0.2}Mn_{0.54}Ni_{0.13}Co_{0.13}]O_2$ Cathodes by $AlPO_4$, Journal of The Electrochemical Society 155 (9), A635-A641, (2008).

Yang, J. et al., Synthesis and Characterization of Carbon-Coated Lithium Transition Metal Phosphates $LiMPO_4$ (M=Fe, Mn, Co, Ni) Prepared Via A Nonaqueous Sol-Gel Route, Journal of The Electrochemical Society 153 (4), A716-A723 (2006).

Yang, J. et al., Intergrown $LiNi_{0.5}Mn_{1.5}O_4 \cdot LiNi_{1/3}Co_{1/3}Mn_{1/3}O_2$ Composite Nanorods as High-Energy Density Cathode Materials for Lithium-Ion Batteries, Journal of Materials Chemistry A, 1, 13742-13745 (2013).

* cited by examiner

STABILIZED ELECTRODES FOR LITHIUM BATTERIES

CROSS-REFERENCE TO RELATED APPLICATIONS

This application claims the benefit of U.S. Provisional Application Ser. No. 62/203,562, filed on Aug. 11, 2015, which is incorporated by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to lithium metal oxide materials and particularly to electrode materials for lithium electrochemical cells and batteries. Such cells and batteries are used widely to power numerous devices, for example, portable electronic appliances, medical systems, transportation systems, aerospace systems, defense systems, and stationary energy storage systems.

BACKGROUND

State-of-the-art lithium batteries do not provide sufficient energy to power electric vehicles for an acceptable driving range. This limitation arises because the electrodes, both the anode, typically graphite, and the cathode, typically, layered $LiMO_2$ (M=Mn, Co, Ni), spinel $LiMn_2O_4$ and olivine $LiFePO_4$, do not offer sufficient capacity or a high enough electrochemical potential to meet the energy demands. Approaches that are currently being adopted to enhance the energy of lithium-ion batteries include the exploitation of composite cathode structures that offer a significantly higher capacity compared to conventional cathode materials. In particular, lithium-rich and manganese-rich high capacity cathodes, such as $xLi_2MnO_3 \cdot (1-x)LiMO_2$ (M=Mn, Ni, Co) materials (often referred to as 'layered-layered' materials because both the $Li_2MnO_3$ and $LiMO_2$ components have layered-type structures) suffer from 'voltage fade' on repeated cycling, which reduces the energy output and efficiency of the cell, thereby compromising the management of cell/battery operation.

There is an ongoing need for new electrode materials to ameliorate the problems associated with the voltage fade of 'layered-layered' electrode materials. The electrodes, electrochemical cells, and batteries of this invention address this need.

SUMMARY OF THE INVENTION

The present invention relates to multi-component, composite lithium metal oxide materials that are comprised of layered and spinel-type structures and structural configurations with intermediate layered and spinel-type character. The composition and structure of the materials in their initial state (i.e., as prepared), are inhomogeneous with the concentration of lithium and/or non-lithium metal ions varying across individual primary or secondary electrode particles. The materials can be used as positive electrodes in advanced, high energy, electrochemical cells.

In one embodiment of the invention, a compositionally and structurally inhomogeneous lithium metal oxide comprises a material, which in its initial, as-prepared, state has the chemical composition of Formula (I): $y[xLi_2MO_3 \cdot (1-x)LiM'O_2] \cdot (1-y)Li_{1+d}M''_{2-d}O_4$; wherein $0 \leq x \leq 1$; $0 < y < 1$; and $0 \leq d \leq 0.33$, preferably wherein $0 \leq x \leq 1$; $0.5 \leq y < 1$; and $0 \leq d \leq 0.2$. M, M', and M" each independently comprises one or more metal ions (e.g., multivalent metal ions). In some embodiments, M comprises one or more metal ions (e.g., Mn, Ti and Zr and/or other multivalent metal ions) that together preferably have a combined average oxidation state of +4; M' comprises one or more metal ions (e.g., Mn, Ni and Co and/or other multivalent metal ions) that together preferably have a combined average oxidation state of +3; and M" comprises one or more metal ions (e.g., Mn, Ni and Co and/or other multivalent metal ions) that together with any excess proportion of lithium, "d", in the $Li_{1+d}M''_{2-d}O_4$ formula above preferably have a combined average oxidation state of +3.5. The $Li_{1+d}M''_{2-d}O_4$ component comprises a spinel crystal structure and each of the $Li_2MO_3$ and the $LiM'O_2$ components comprise layered crystal structures. In a preferred embodiment, $0.75 \leq y < 1$ (more preferably ($0.85 \leq y < 1$). Preferably, $0 \leq x \leq 0.5$. When x is not zero, the lithium metal oxide electrode is described, for convenience, as a 'layered-layered-spinel' composite material. When x is zero, the material can be described, for convenience, as a 'layered-spinel' composite material. Individual particles of the material of Formula (I) are structurally and compositionally inhomogeneous in that one or more of x, y, d, M, M' and M" varies from surface to interior across the particles. It must be recognized that these electrode structures are extremely complex, as is well known in the art, and that deviations from ideal layered and spinel compositions and structures can be expected, for example, by the creation of cation and anion vacancies, stacking faults, structural and compositional disorder, particularly at domain or grain boundaries. This invention, therefore, extends to include these deviations from an ideal electrode structure, composition, and cation and anion arrangements.

The chemical compositions of the materials of this invention vary from the interior of the electrode particles to the surface of the particles, e.g., by having different concentrations of the lithium and/or the non-lithium (M, M', M") metal ions, and/or the proportions of the layered and spinel components within the materials, either at the surface of the particles relative to the interior, e.g., in discrete layers, or in a gradient across the particles from surface to interior, as desired. For example, when used as a positive electrode in lithium electrochemical cells, the core of the electrode particle can be made nickel- and/or cobalt rich relative to manganese, while the surface can be made manganese rich relative to nickel and or cobalt, with regions between the surface and the bulk varying in composition and structure. Alternatively, or in addition, other stabilizing cations and/or anions such as aluminum, titanium, phosphorus, fluorine and the like, can be concentrated predominantly at the surface of the electrode particles, with lesser or no concentration in the bulk (i.e., interior) of the particles. Likewise, the structures in the interior of the electrode particles can be stabilized by relatively small amounts, e.g., 0.1 to 5 atomic percent or higher, if desired, of dopant cations or anions, such as magnesium, aluminum, titanium and fluorine.

The electrodes of the invention can be designed such that the core of the electrode particles contains a higher concentration of a layered, 'layered-layered', layered-layered-spinel' and/or a spinel component while, conversely, the surface contains a higher concentration of a spinel, 'layeredlayered-spine, layered-layered' or layered component, to provide a gradient concentration across the particles that can vary uniformly or non-uniformly.

The structures and composition of particles of the electrode materials are inhomogeneous, and can include structural configurations with intermediate layered- and spinel-type character, i.e., the Li, M, M' and M" cations of the spinel and layered electrode components can be partially disordered over the octahedral and tetrahedral sites of the layered and spinel components of the structurally integrated composite $y[xLi_2MO_3 \cdot (1-x)LiM'O_2] \cdot (1-y)Li_{1+d}M''_{2-d}O_4$ lithium metal oxide material, thereby yielding complex cation arrangements in the multi-component, composite lithium metal oxide electrode structures. In this respect, the intermediate layered- and spinel-type configurations can include, for example, localized rocksalt, defect rocksalt, defect spinel, and defect layered configurations of the transition metal ions within the structure. The structures of this invention can also include distorted atomic arrangements of the cations and anions, such as dislocations and stacking faults, particularly at grain boundaries. The invention also includes, for example, a process for fabricating the multi-component electrode materials in which the composition and structure is varied across the electrode particles, for example, a co-precipitation process, or a process as described broadly by Koenig, Belharouak, Amine and Deng in U.S. Pat. No. 8,591,774, or a process using a vortex reactor.

Preferably, M comprises at least one metal selected from the group consisting of Mn, Ti and Zr; M' comprises at least one metal selected from the group consisting of Mn, Ni, and Co, and M" comprises at least one metal selected from the group consisting of Mn, Ni, and Co. Optionally, each of M and M' can independently further comprise one or more metals, preferably selected from the group consisting of Al, Mg, and Li; M can further comprise one or more metals, preferably selected from the group consisting of a first or second row transition metal other than Mn, Ti, and Zr; M' can further comprise one or more metals preferably selected from the group consisting of a first or second row transition metal other than Mn, Ni and Co, provided that, using the formal integer oxidation states of M, M' and M" in the $Li_2MO_3$, $LiM'O_2$ and $Li_{1+d}M''_{2-d}O_4$ components of the phase diagram of FIG. 1 to ensure charge neutrality, the average oxidation state of the combined M ions is +4, and the average oxidation state of the combined M' ions is +3; and M" can further comprise one or more metals selected from the group consisting of Al, Mg, and a first or second row transition metal other than Mn, Ni and Co (e.g., Ti, Fe, Zr) such that the M" ions in the spinel formula $Li_{1+d}M''_{2-d}O_4$ comprise one or more metal ions that together with any excess proportion of lithium, "d", in the spinel formula above preferably have a combined average oxidation state of +3.5.

In some embodiments, the spinel component, $Li_{1+d}M''_{2-d}O_4$, at the surface and/or in the interior of the particles comprises a lithium-rich spinel (i.e., including an excess proportion of Li, represented by "d", where $0<d\leq 0.33$). Preferably, M" comprises Mn, Ni, Co, or a combination thereof. For example, M" can comprise at least one metal selected from the group consisting of Mn, Ni and Co; and d>0. In some other embodiments, M is Mn; M' comprises Mn and Ni; and the spinel component, $Li_{1+d}M''_{2-d}O_4$, comprises Mn, Ni, and Co. For example, M" can comprise at least one metal selected from the group consisting of Mn, Ni and Co, with $0<d\leq 0.33$.

In some embodiments, a 'layered-layered-spinel' electrode material can include particles with a surface or interior region in which M" comprises Mn, Ni and Co. For example, Co can constitute about 1 atom percent to about 30 atom percent of transition metals in the spinel component, $Li_{1+d}M''_{2-d}O_4$; and the combination of Mn and Ni constitutes about 70 atom percent to about 99 atom percent of the transition metals in the spinel component. Preferably, the combination of Mn and Ni constitutes about 90 atom percent of the transition metals in the spinel component and Co constitutes about 10 atom percent of the transition metals in the spinel component. In a preferred embodiment, the spinel component constitutes about 50 atom percent Mn, about 30 atom percent Ni, and about 20 atom percent Co, based on the total transition metals in the spinel component.

The compositions of the 'layered-layered-spine' and 'layered-spine' materials at the surface and/or interior of the particles thereof can be tailored for optimum electrochemical performance. For example, it has been discovered that the cobalt content plays a significant role in determining the performance of these materials. In some embodiments, the Co content in the material of Formula (I) comprises more than 50% of the combined M, M', and M" content, preferably in the interior of the particles of the electrode materials. Alternatively, the Co content can comprise less than 50% of the combined M, M', and M" content. In a further embodiment, the Ni content in the material of Formula (I) can comprise more than 50% of the combined M, M', and M" content, for example, 60%, 70%, 80% or 90%. In yet a further embodiment, the Mn content in the material of Formula (I) can comprise more than 50% in the spinel component, particularly at the surface of the electrode particles.

In some embodiments, x=0, and the electrode material comprises a two-component 'layered-spinel' composite compound, which in an initial state has the chemical composition of Formula (II): $yLiM'O_2 \cdot (1-y)Li_{1+d}M''_{2-d}O_4$; wherein $0<y<1$; $0\leq d\leq 0.33$; M' comprises one or more metal ions that together preferably have a combined average oxidation state of +3; and M" comprises one or more metal ions that together with the excess proportion, d, of lithium, preferably have a combined average oxidation state of +3.5; wherein the $Li_{1+d}M''_{2-d}O_4$ component comprises a spinel crystal lattice structure; and the $LiM'O_2$ component thereof comprises a layered crystal lattice structure. In a preferred embodiment, $0.75 \leq y < 1$ (e.g., $0.85 \leq y < 1$).

In some embodiments of the 'layered-spinel' material of Formula (II), each of M' comprises at least one metal selected from the group consisting of Mn, Ni, and Co; and M" comprises at least one metal selected from the group consisting of Mn, Ni and Co. Optionally, M' further comprises at least one metal selected from the group consisting of Al, Mg, Li, and a first or second row transition metal other than Mn, Ni and Co; and M" further comprises at least one metal selected from the group consisting of Al, Mg, and a first or second row transition metal other than Mn, Ni and Co. In a preferred embodiment of Formula (II), $0<d\leq 0.2$; and M" comprises Mn, Ni, Co, or a combination thereof.

The Li, M' and M" cations of the 'layered-spinel' and 'layered-layered-spinel' materials can be partially disordered over the octahedral and tetrahedral sites of the layered and spinel components of the composite lithium metal oxide structure.

In another aspect, the present invention provides a positive electrode for a lithium electrochemical cell comprising a compositionally and structurally inhomogeneous 'layered-spinel' and/or a 'layered-layered-spinel' electrode material, preferably in contact with a metal current collector. If, desired, the 'layered-layered-spinel' and/or 'layered-spinel' materials can be formulated with another active electrode material, such as carbon. The electrode is useful as a positive electrode in lithium electrochemical cells and batteries.

BRIEF DESCRIPTION OF THE DRAWINGS

The invention consists of certain novel features and a combination of parts hereinafter fully described, illustrated in the accompanying non-limiting drawings and examples, it being understood that various changes in the details may be made without departing from the spirit, or sacrificing any of the advantages of the present invention.

DETAILED DESCRIPTION OF PREFERRED EMBODIMENTS

Figure 1:
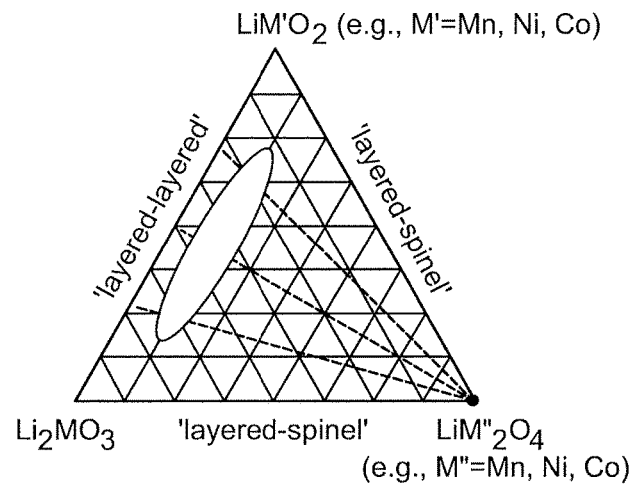
FIG. 1 depicts a $Li_2MO_3$—$LiM'O_2$—$LiM''_2O_4$ compositional phase diagram, in which $Li_2MO_3$, $LiM'O_2$, and $Li_{1+d}M''_{2-d}O_4$ (represented for simplicity as $LiM''_2O_4$, i.e., where d is 0) are the layered, layered, and spinel components of a 'layered-layered-spine' electrode material.

This invention relates to stabilized lithium-metal oxide materials that fall within the scope of structurally compatible, composite 'layered-layered', 'layered-spinel', and 'layered-layered-spinel' materials that contain, e.g., a layered $Li_2MnO_3$ component. The composite materials are particulate metal oxide materials of formula: $y[xLi_2MO_3·(1-x)LiM'O_2]·(1-y)Li_{1+d}M''_{2-d}O_4$; wherein $0 \leq x \leq 1$; $0 < y < 1$; $0 \leq d \leq 0.33$, preferably wherein $0 \leq x \leq 1$; $0.5 \leq y < 1$; and $0 \leq d \leq 0.2$, in which the chemical composition of the material varies across the particles. For example, the surface of the particles can have different concentrations of the lithium and/or the non-lithium (M, M', M'') metal ions compared to the concentrations of the lithium and/or the non-lithium (M, M', M'') metal ions in the interior of the particles. Similarly, there may be a gradient of the Li, M, M', and M'' metal ion concentrations across the particles, as desired. More specifically, therefore, the invention, relates to a structurally inhomogeneous lithium metal oxide material having the Formula (I):

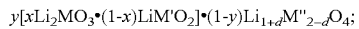

wherein:

$0 \leq x \leq 1$;

$0 < y < 1$;

$0 \leq d \leq 0.33$;

M comprises one or more metal ions that together preferably have a combined average oxidation state of +4;

M' comprises one or more metal ions that together preferably have a combined average oxidation state of +3; and M'' comprises one or more metal ions that together with the Mn and excess proportion, d, of lithium, preferably have a combined average oxidation state of +3.5; and wherein the $Li_{1+d}M''_{2-d}O_4$ component comprises a spinel structure, and each of the $Li_2MO_3$ and the $LiM'O_2$ components thereof comprise layered structures; and wherein the composition of the individual particles the material of Formula (I) varies from surface to interior across the material particles, i.e., by having a different value of at least one of x, y, d, and/or a different selection of M, M' and M'' at the surface relative to the interior of the particles. For examples, the particles can be layered with different compositions of Formula (I) in the layers thereof, or the composition of the particles can vary in a gradient for one or more of x, y, d, M, M' and M'' from surface to interior.

In one example, when used as an electrode material, the core of the electrode particle can be made nickel- and/or cobalt rich relative to manganese, while the surface can be made manganese rich relative to nickel and or cobalt, with regions between the surface and the bulk varying in composition and structure. Alternatively or in addition, other stabilizing ions, such as aluminum, titanium, phosphorus, and the like, can be concentrated predominantly at the surface of the electrode particles, with lesser or no concentration in the bulk (i.e., interior) of the particles. Furthermore, the electrodes can be designed such that the core of the electrode particles contains a higher concentration of the layered component, while the surface contains a higher concentration of the spinel component, or vice versa.

As noted above, the structures and composition of the electrode materials are therefore inhomogeneous and can include structural configurations with intermediate layered- and spinel-type character, i.e., the Li, Mn, M, M' and M'' cations of the spinel and layered electrode components can be partially disordered over the octahedral and tetrahedral sites of the layered and spinel components of the structurally integrated composite $y[xLi_2MO_3·(1-x)LiM'O_2](1-y)$-

$Li_{1+d}M''_{2-d}O_4$ lithium metal oxide material, thereby yielding complex cation arrangements in the multi-component, composite lithium metal oxide electrode structures.

The multi-component electrode materials in which the composition and structure is varied across the electrode particles, can be prepared, for example, by a co-precipitation process, or a process as described broadly by Koenig, Belharouak, Amine and Deng in U.S. Pat. No. 8,591,774, or a process using a vortex reactor to create a gradient of compositions. One method involves synthesizing a composition with a core and successively forming outer layers having different chemical compositions within the formula $y[xLi_2MO_3 \cdot (1-x)LiM'O_2] \cdot (1-y)Li_{1+d}M''_{2-d}O_4$; it involves first synthesizing the core with a first composition (e.g., having one specific selection of the parameters x, y, d, M, M' and M'' in the formula $y[xLi_2MO_3 \cdot (1-x)LiM'O_2] \cdot (1-y)Li_{1+d}M''_{2-d}O_4$), and then including the particles of the first composition in a reaction mixture for preparing successive layers having a different selection of the parameters x, y, d, M, M' and M'', which will be formed around the particles of the first composition, to form differing concentrations of lithium and M, M' and M'' ions and differing spinel and layered compositions across the particles. Both the first and outer compositions have formulas of $y[xLi_2MO_3 \cdot (1-x)LiM'O_2] \cdot (1-y)Li_{1+d}M''_{2-d}O_4$, but with different values for x, y, and d, and/or different selections of the metal ions M, M' and M''.

The following non-limiting examples of single-composition materials, i.e., materials with particles including only one selection of x, y, d, M, M' and M'', are provided below, to illustrate the general principles for preparing compositions of the formula $y[xLi_2MO_3 \cdot (1-x)LiM'O_2] \cdot (1-y)Li_{1+d}M''_{2-d}O_4$. In addition, selected properties of these materials are illustrated as well.

Selected compositions of these materials have been discovered that appear to arrest a voltage fade phenomenon which occurs when state-of-the-art 'layered-layered' and 'layered-spinel' electrode materials are repeatedly cycled in lithium cells. The preferred precursor compound for synthesizing the improved compounds and compositions of the invention comprises $Li_2MnO_3$ (or in conventional layered notation $Li[Li_{1/3}Mn_{2/3}]O_2$).

Broadly speaking, it has been discovered that the voltage fade of high-capacity 'layered-layered' $xLi_2MnO_3 \cdot (1-x)LiMO_2$ electrodes, in which M is a metal cation is comprised, typically, of Mn, Ni and Co, can be suppressed by introducing a spinel component into the 'layered-layered' structure by careful selection and control of the $Li_2MnO_3$ and Co content and overall composition of the resulting 'layered-layered-spinel' products. In a general embodiment, the materials of the invention can be defined on a 'layered-layered-spinel' $Li_2MO_3$—$LiM'O_2$—$LiM''_2O_4$ phase diagram, shown schematically in FIG. 1, in which $Li_2MO_3$, $LiM'O_2$, and $Li_{1+d}M''_{2-d}O_4$ (represented in the diagram as $LiM''_2O_4$, for simplicity, i.e., where d is 0) are the layered, layered, and spinel components, respectively, that described the overall composition of the electrode within the $Li_2MO_3$—$LiM'O_2$—$LiM''_2O_4$ phase diagram; and where M is one or more metal cations with a combined average tetravalent oxidation state, preferably $Mn^{4+}$; M' is one or more metal cations with a combined average trivalent oxidation state, preferably comprising manganese, nickel and cobalt ions, and M'' comprises one or more metal cations with a combined average oxidation state of +3.5, preferably comprising manganese, nickel and cobalt ions, optionally with lithium ions. For example, the average oxidation state of the M'' cations in the $Li_{1+d}M''_{2-d}O_4$ component for d=0 would be +3.5, whereas for d=0.33 (i.e., $Li_{1.33}Mn_{1.67}O_4$), the average oxidation state of the Mn ions would be +4.0, and the combined average oxidation state of the M'' ions (i.e., 1.67 $Mn^{4+}$ ions and 0.33 $Li^+$ ions) would be +3.5.

Composite 'layered-layered-spinel' electrode structures and materials (which can, in general, be regarded overall as a composite structure with both layered and spinel character), have the advantage of providing a voltage profile with both the sloping character of the layered components and the voltage plateaus of the spinel components, thus smoothing the overall voltage profile of high capacity, structurally-integrated, 'composite' layered-spinel electrode materials. The spinel electrode materials of this invention are broad in compositional scope and structure. In an ideal $LiM''_2O_4$ spinel structure, the metal cations are distributed in octahedral sites in alternating close-packed oxygen layers in a 3:1 ratio of transition metals to Li, whereas, in an ideal $LiM'O_2$ layered structure, the M' transition metal cations occupy all the octahedral sites in alternating layers, without any Li being present in those layers. Therefore, in the composite layered-spinel structures of this invention, the ratio of metal cations in alternating layers of the close-packed oxygen array can vary within the structure from the 3:1 transition metal to Li ratio of an ideal spinel configuration to the corresponding ideal layered configuration with no lithium in the transition metal layers. Furthermore, the Li, Mn, M, M' and M'' cations of the spinel and layered electrode materials can be partially disordered over the octahedral and tetrahedral sites of the layered and spinel components of the composite $y[xLi_2MO_3 \cdot (1-x)LiM'O_2] \cdot (1-y)Li_{1+d}M''_{2-d}O_4$ lithium metal oxide structure, yielding complex cation arrangements in the spinel and layered components and in the overall and highly complex 'layered-layered-spinel' composite structures. In some instances, the structural complexity of the electrode materials makes it difficult to distinguish the individual components from one another, particularly when the intergrown layered $Li_2MO_3$ and $LiM'O_2$ components are disordered within a single, structurally-compatible close-packed oxide array, in which case the electrode composition can be simply regarded as, and represented, by a 'layered-spinel' structure.

Compositions and structures falling within the formula $y[xLi_2MO_3 \cdot (1-x)LiM'O_2] \cdot (1-y)Li_{1+d}M''_{2-d}O_4$, as described above, for use as a surface layer or in the interior of the metal oxide particles of the electrode materials can be synthesized, e.g., by using $Li_2MnO_3$ as a precursor and reacting it with the required amount of Ni and Co in solution followed by a heat-treatment step, as described by Croy et al., in *Electrochemistry Communications*, Volume 13, pages 1063-1066 (2011). For example, a 'layered-layered' product with a targeted composition $0.25Li_2MnO_3 \cdot 0.75LiMn_{0.375}Ni_{0.375}Co_{0.25}O_2$ can be prepared by reacting a $Li_2MnO_3$ precursor with the stoichiometrically-required amounts of nickel and cobalt nitrates in a 0.1 M solution of $HNO_3$, and then stirring the mixture overnight at room temperature. Thereafter, the liquid from the solution is evaporated at approximately 70° C., and the resulting solid product collected and ground to a powder. The powder is then annealed at about 850° C. for about 24 hours in air. Variations in synthesis parameters, e.g., temperature, dwell times, rates of cooling, etc., can be used to optimize the structures and electrochemical properties of the materials of this invention for a given application or use.

In order to synthesize 'layered-layered-spinel' products of this invention, the same procedure is followed, as described above, but using a smaller amount of lithium than is required for the 'layered-layered' composition, which drives the composition of the final product toward the $LiM'_2O_4$ spinel apex of the phase diagram in FIG. 1, thereby resulting in the 'layered-layered-spinel' products. Alternatively, the compositions of the advanced materials of this invention can be synthesized by other processing methods that are known in the art, for example, by sol-gel and precipitation processing techniques using precursors that decompose during synthesis, such as metal hydroxides, carbonates and oxalates, or by solid state reactions, thereby broadening the scope of this invention.

In another example, the Co content in the metal oxide of formula $y[xLi_2MO_3 \cdot (1-x)LiM'O_2] \cdot (1-y)Li_{1+d}M''_{2-d}O_4$ comprises more than 50% of the combined M, M', and M'' content. Alternatively, the Co content can comprise less than 50% of the combined M, M', and M'' content. In yet another embodiment, the Ni content in the $y[xLi_2MO_3 \cdot (1-x)LiM'O_2] \cdot (1-y)Li_{1+d}M''_{2-d}O_4$ can comprise more than 50% of the combined M, M', and M'' content, for example, 60%, 70%, 80% or 90%.

Example 1

Specific examples of the processing methods that can be employed to synthesize the materials of formula $y[xLi_2MO_3 \cdot (1-x)LiM'O_2] \cdot (1-y)Li_{1+d}M''_{2-d}O_4$ include as a surface and/or interior component include:

Method A. $(NiMnCo)C_2O_4$ (i.e., metal oxalate) precursors are prepared from $NiSO_4 \cdot 6H_2O$, $MnSO_4 \cdot H_2O$, $CoSO_4 \cdot 7H_2O$, and $Na_2C_2O_4$ using the required ratios of Ni, Mn and Co for a targeted stoichiometry in the final product (the 'oxalate method'). An aqueous solution containing the required stoichiometric amounts of metal sulfates is added under stirring into a solution of sodium oxalate. The solution is then stirred for about 3 hours at about 70° C. The co-precipitated powder is filtered, washed, and dried in air at about 105° C. The dried powders are thoroughly mixed with stoichiometric amounts of lithium carbonate and annealed at about 450° C. for about 12 hours in air, followed by grinding and an annealing step at about 750° C. for about 12 hours (also in air) to prepare materials with a desired composition. Other annealing conditions can include no intermediate firing step, different annealing times and different temperatures.

Method B. Materials from $Li_2MnO_3$ precursors are prepared by the following procedure: $Li_2MnO_3$ are added under stirring into a 0.1 M $HNO_3$ solution at room temperature (the '$Li_2MnO_3$ method'). The required amounts of $Ni(NO_3)_2 \cdot 6H_2O$, $Co(NO_3)_2 \cdot 6H_2O$, and $LiNO_3$ for a desired stoichiometry in the final product are added to the solution and subsequently stirred overnight. The solution is then heated to dryness at approximately 80° C., then the solid product is ground and annealed in air at about 850° C. for about 24 hours.

To prepare materials with particles having different interior and exterior compositions, a first, core material having a first selection of x, y, d, M, M' and M'' is prepared, e.g., by either of Methods A or B, and then particles of the core material are included with suitable raw materials for forming (e.g., by Method A or Method B) a layer of material having a second selection of x, y, d, M, M' and M'' around the particles of the core material, to thereby produce foundational core-shell particles having a different surface (shell) composition relative to the composition of the interior of the resulting particles. This process can be repeated by depositing another layer consisting of a third selection of x, y, d, M, M' and M'' on the foundational core-shell particles to form a three-component electrode particle, and so on, to produce as many compositionally and structurally different layers, or gradient structures, as desired.

The versatility in synthesizing the 'layered-layered-spinel' and 'layered-spinel' electrode materials for use as a surface layer or within the interior of the electrode particles has been demonstrated by methods using (1) metal oxide precursors and (2) a $Li_2MnO_3$ template into which the required metal cations and oxygen are introduced to create the composite structures as described by Croy et al., in *Electrochemistry Communications*, Volume 13, pages 1063-1066 (2011).

Figure 2:
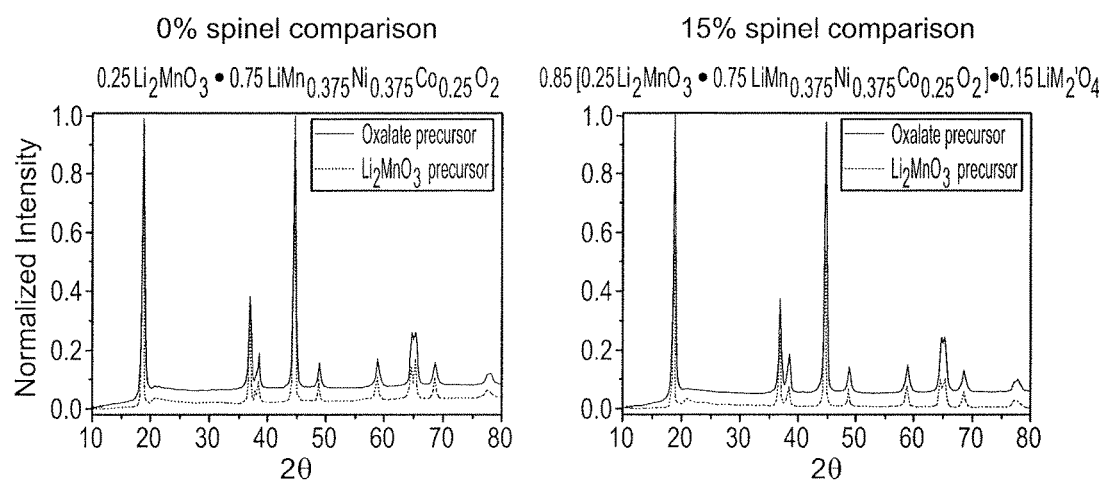
FIG. 2 depicts the X-ray diffraction patterns of (left) 'layered-layered' $0.25Li_2MnO_3·0.75LiMn_{0.375}Co_{0.25}O_2$ products when synthesized from a metal oxalate and $Li_2MnO_3$ precursors, and (right) layered-layered spinel products synthesized from lithium-deficient compositions of $0.25Li_2MnO_3·0.75LiMn_{0.375}Ni_{0.375}Co_{0.25}O_2$.

For example, FIG. 2 (left) shows the powder X-ray diffraction patterns (CuKα radiation) of a 'layered-layered' $0.25Li_2MnO_3 \cdot 0.75LiMn_{0.375}Ni_{0.375}Co_{0.25}O_2$ composition (i.e., targeting 0% spinel in the structure) using manganese, nickel and cobalt oxalate precursors and the same composition using a $Li_2MnO_3$ template for comparison; FIG. 2 (right) shows the powder X-ray diffraction patterns of a 'layered-layered-spinel product with 15% spinel derived from $0.25Li_2MnO_3 \cdot 0.75LiMn_{0.375}Ni_{0.375}Co_{0.25}O_2$ by reducing the lithium content in the starting precursors by 9%. These X-ray diffraction patterns are similar, which highlights the difficulty in differentiating the 'layered-layered' structures from 'layered-layered-spinel' derivatives by routine X-ray diffraction methods.

Cathodes for electrochemical tests were prepared by coating Al foil with a slurry containing 82 percent by weight (wt %) of the oxide powder, 8 wt % SUPER P carbon (TIMCAL Ltd.), and 10 wt % polyvinylidene difluoride (PVDF) binder in NMP and assembled in coin cells (size 2032). The cells contained a metallic lithium anode. The electrolyte was a 1.2 M solution of $LiPF_6$ in a 3:7 mixture of ethylene carbonate (EC) and ethyl methyl carbonate (EMC). Coin cells were assembled in a glovebox under an inert argon atmosphere.

Figure 3:
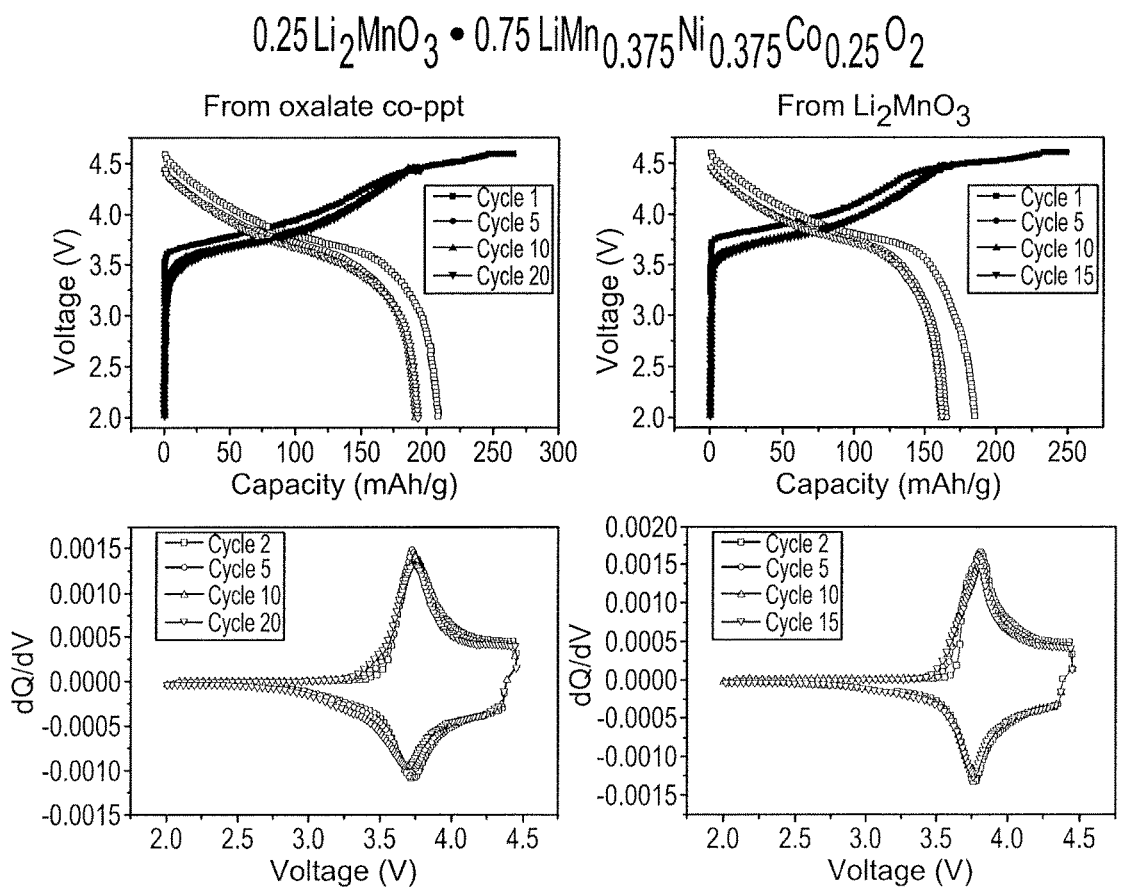
FIG. 3 depicts (top) the electrochemical profiles of lithium half cells in which the $0.25Li_2MnO_3·0.75LiMn_{0.375}Ni_{0.375}Co_{0.25}O_2$ cathode was prepared from (left) oxalate and (right) $Li_2MnO_3$ precursors, the cells being charged and discharged between 4.45 and 2.0 V, after an initial activation charge to 4.6 V, at 15 mA/g.

FIG. 3 shows (top, left and right) the electrochemical cycling profiles and (bottom) the corresponding dQ/dV plots of baseline $Li/0.25Li_2MnO_3 \cdot 0.75LiMn_{0.375}Ni_{0.375}Co_{0.25}O_2$ cells, in which the 'layered-layered' cathode was synthesized by the oxalate and $Li_2MnO_3$ methods, respectively, when cycled between 4.45 and 2.0 V after an initial activation charge to 4.6 V. Both cells show exceptional stability over this voltage range with insignificant voltage fade.

Figure 4:
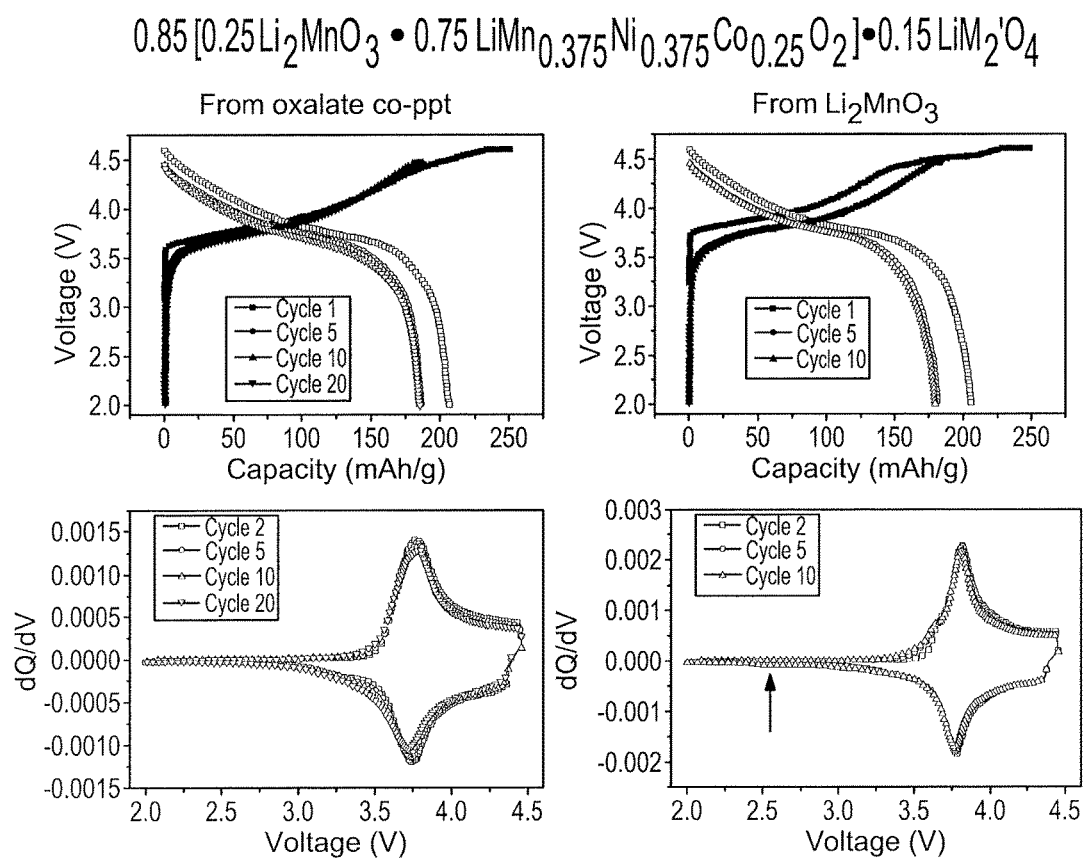
FIG. 4 depicts (top) the electrochemical profiles of lithium half cells in which the 'layered-layered-spinel' cathode with 15% spinel was derived from a $0.25Li_2MnO_3·0.75LiMn_{0.375}Ni_{0.375}Co_{0.25}O_2$ composition prepared from (left) oxalate and (right) $Li_2MnO_3$ precursors, the cells being charged and discharged between 4.45 and 2.0 V, after an initial activation charge to 4.6 V, at 15 mA/g.

FIG. 4 shows (top, left and right) the electrochemical cycling profiles and (bottom) the corresponding dQ/dV plots of lithium cells in which the 'layered-layered-spinel' cathode, when synthesized by the oxalate and $Li_2MnO_3$ methods, respectively, was derived from a $0.25Li_2MnO_3 \cdot 0.75LiMn_{0.375}Ni_{0.375}Co_{0.25}O_2$ composition by reducing the lithium in the composition by 9%, when cycled between 4.45 and 2.0 V after an initial activation charge to 4.6 V. Both cells cycled with exceptional stability over this voltage range, delivering a steady capacity between 180 and 190 mAh/g at an average voltage of approximately 3.54 V with insignificant voltage fade. The electrochemical data highlight the difficulty in observing the spinel component when present in low concentrations. Note, however, that the dQ/dV plot of the cell containing the 'layered-layered-spinel' electrode in FIG. 4 (bottom, right) shows a weak reduction peak at approximately 2.6 V (arrowed in FIG. 4), which indicates the presence of a spinel or spinel-like component in the structure. It should be noted that low concentrations of spinel materials, particularly in nanodomains, likely would be more readily observable in high resolution transmission electron microscopy (TEM) images.

Figure 5:
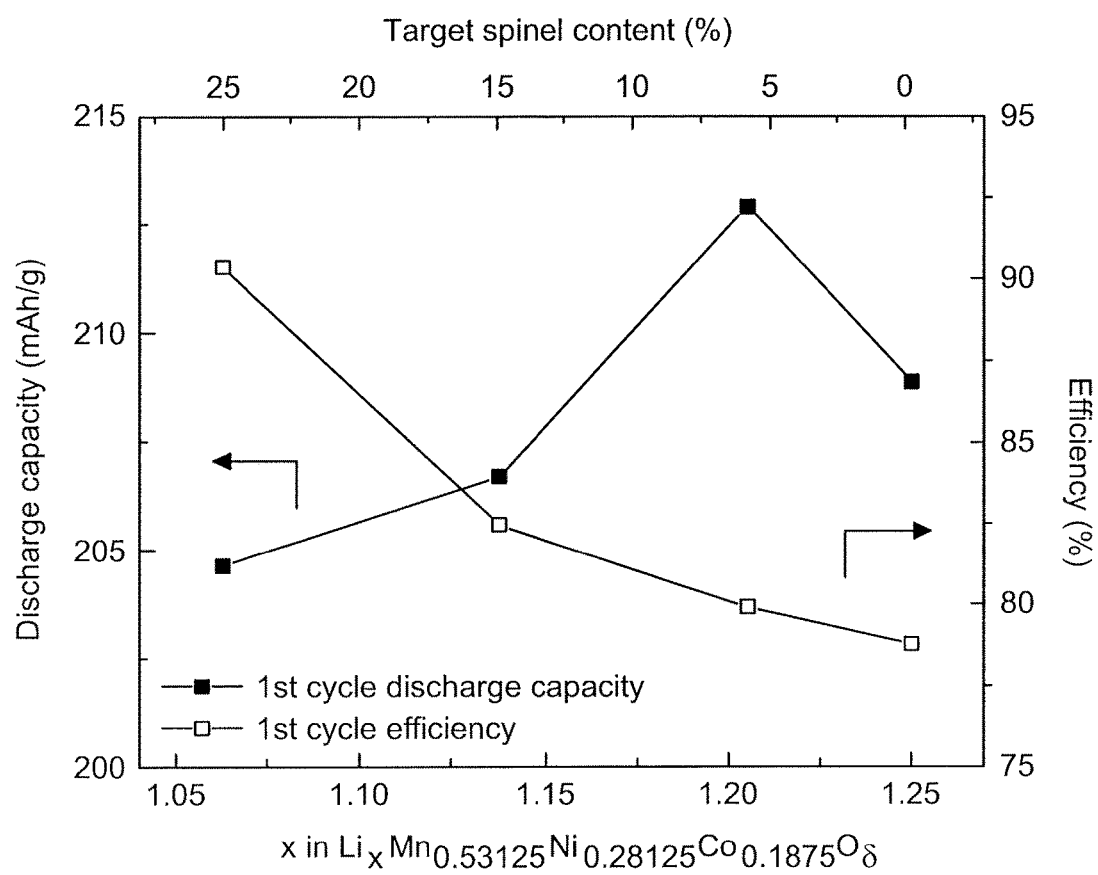
FIG. 5 depicts the first-cycle discharge capacity (■) and first-cycle efficiency (□) as a function of cathode composition, x, in $Li_xMn_{0.53125}Ni_{0.28125}Co_{0.18750}O_\delta$ and the corresponding target spinel content as a percentage in the 'layered-layered-spinel' cathode.

A series of 'layered-layered-spinel' electrode compositions with varying spinel content, synthesized by the 'oxalate method', was investigated electrochemically. For one experiment, electrodes were prepared by using less lithium than would normally be used for synthesizing a 'layered-layered' electrode of nominal composition $0.25Li_2MnO_3 \cdot 0.75LiMn_{0.375}Ni_{0.375}Co_{0.250}O_2$ in which the Mn:Ni:Co ratio is 0.53125:0.28125:0.18750; this 'layered-layered-spinel' electrode is normalized to read '$Li_xMn_{0.53125}Ni_{0.28125}Co_{0.18750}O_\delta$' for convenience and simplicity, with the value of x=1.25 and δ=2.25 representing the parent 'layered-layered' composition $0.25Li_2MnO_3 \cdot 0.75LiMn_{0.375}Ni_{0.375}Co_{0.250}O_2$. A plot of first-cycle capacity and first-cycle efficiency vs. lithium (spinel) content of a lithium cell containing the '$Li_xMn_{0.53125}Ni_{0.28125}Co_{0.18750}O_\delta$' electrode is shown in FIG. 5. The top x-axis shows the increasing target spinel content as a function of decreasing lithium content. The electrodes were first charged to 4.6 V and discharged to 2.0 V in lithium coin cells. The plot of solid squares indicates that the electrode capacity reaches a maximum by lowering the lithium content corresponding to spinel content of approximately 6%, after which the electrode capacity decreases, in accordance with a significant advantage of the layered-layered-spinel electrodes of this invention over conventional layered-layered electrodes. Lowering the lithium content, thereby increasing the spinel content, also has the significant advantage of increasing the first-cycle efficiency of the cell (open squares).

Example 2. Full Concentration Gradient 'Layered-Spinel' Cathode

To make the metal hydroxide precursor with a transition metal gradient, a 4 L stainless steel stirred tank reactor at 55° C. was charged with 1.5 L of 0.4M $NH_3OH$ solution. $N_2$ gas was then bubbled into the solution to de-aerate the reactor. While stirring at about 1,000 rpm, a 2M $NH_3$ solution and a 2M Mn-rich transition metal sulfate solution (i.e., a solution with Mn present at greater than 50 mole percent on a total transition metal basis) comprising $NiSO_4 \cdot 6H_2O$, $MnSO_4 \cdot H_2O$ and $CoSO_4 \cdot 7H_2O$, were pumped into the reactor, while a 2M Mn-poor solution (i.e., a solution with Mn present at less than 50 mole percent on a total transition metal basis) of the same components was pumped from its tank into the Mn-rich container with a flowrate ratio of about 1:2:1 for the three streams, respectively, over about 24 hours. A pH meter was used to control the dosing of 4M NaOH into the reactor to maintain the solution pH at about 11-11.5.

Figure 6:
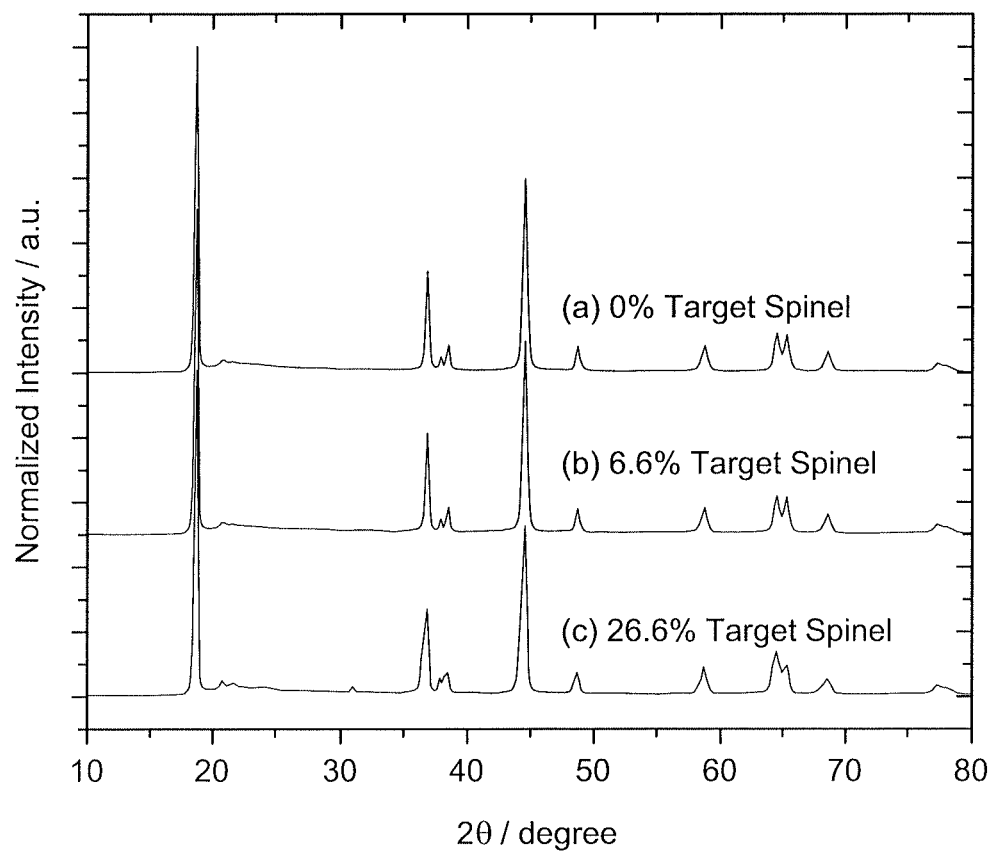
FIG. 6 depicts the X-ray diffraction patterns of full concentration gradient cathode materials having a targeted spinel content of (a) 0%, (b) 6.6%, and (c) 26.6%.

The starting composition ratios of Ni:Mn:Co for the Mn-rich and Mn-poor solutions were 0.1875:0.6875:0.125 and 0.375:0.375:0.25, respectively. Upon completion of the pumping, the resulting full concentration gradient (FCG) metal hydroxides were collected and washed with distilled water until the pH became neutral. The resulting washed powders were then dried at about 110° C. in a $N_2$ environment. After drying, the FCG precursor metal hydroxides were mixed with $LiOH \cdot H_2O$ at ratios of about 1.25:1, 1.2:1 and 1.05:1 (Li:M(OH)$_2$ ratio), which corresponds to about 0%, 6.6% and 26.6% target spinel content. The targeted spinel compositions were calculated by reducing the lithium content according to the procedure described by Long et al. in the Journal of the Electrochemical Society, Volume 161, pages A2160-A2167 (2014) and references therein. After gently grinding the FCG materials, the samples were calcined using the following heating protocol: 2°/min to 800° C., dwell 20 h, and then allowed to cool naturally to room temperature. The X-ray diffraction patterns of the products with a 0%, 6.6% and 26.6% target spinel composition are presented in FIG. 6, Panels a, b and c, respectively. The coalescing of the peaks near 65° 2θ, as the lithium loading is decreased, is consistent with the presence of some transition metal cations in the lithium layer of the layered structure either by cation exchange between alternate layers or by the formation of spinel or spinel-like configurations. Furthermore, a weak peak at 32° 2θ is consistent with the (220) reflection of a cubic spinel structure, for example one with Fd-3 m symmetry, in which cations such as lithium ion and/or a transition metal ion occupy the 8a tetrahedral sites of the structure.

Cathode laminates comprised of active calcined FGC material, PVDF binder and carbon (SUPERP carbon), in a respective wt. ratio of about 84:8:8, were prepared by mixing in N-methylpyrrolidone and then casting the resulting mixture onto Al foil using a 7 mil doctor blade. Coin cells with a Li foil anode, a 2350 CELGARD separator, and the cathode laminate were assembled in a glovebox ($H_2O$ and $O_2$<1 ppm). Coin cells were cycled galvanostatically using a MACCOR 4000 unit at 15 mA/g between 4.45 and 2.50 V after one initial activation cycle between 4.60 and 2.50 V, with all charge cycles ending with a 30 min voltage hold.

Figure 7:
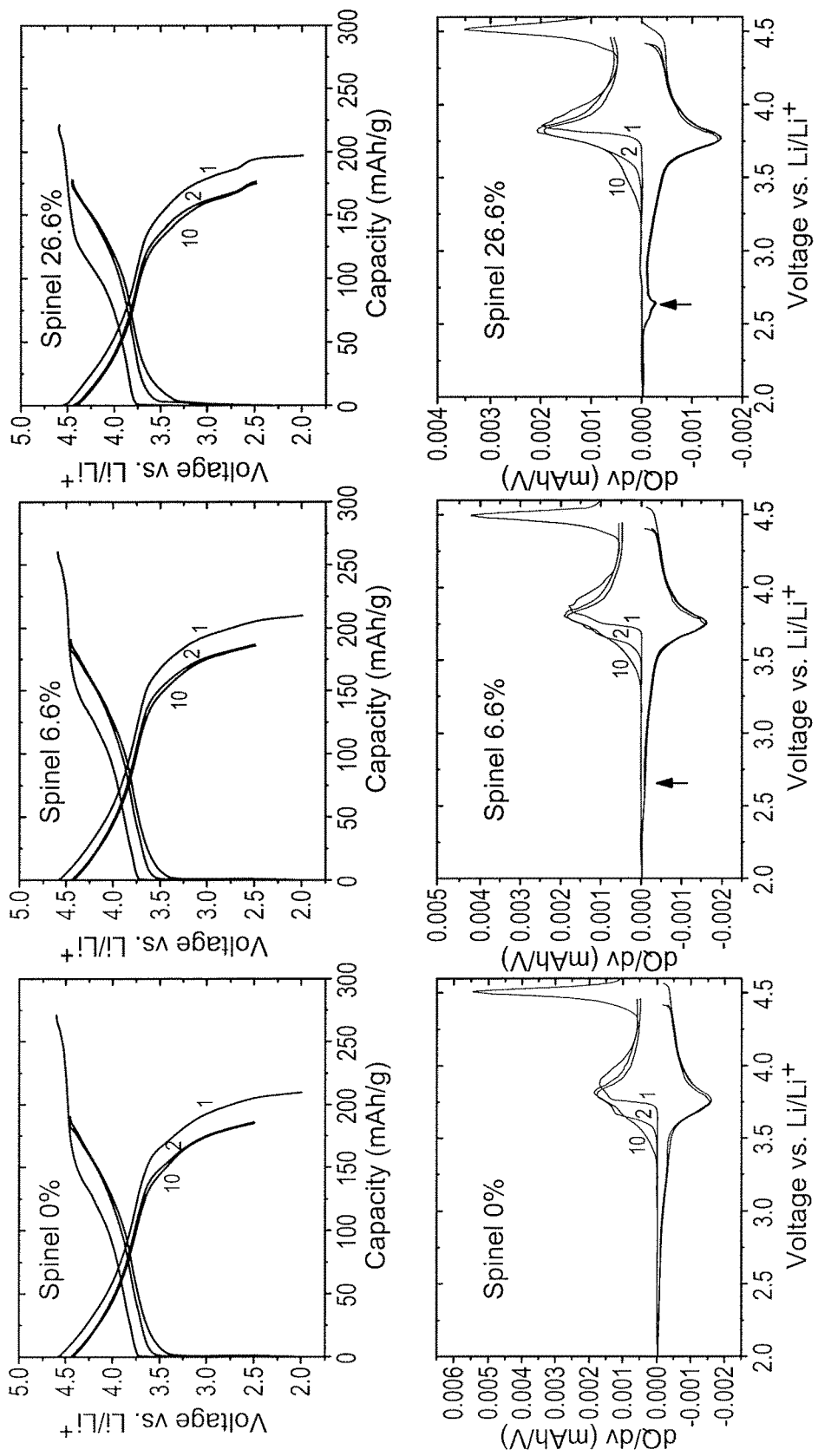
FIG. 7 depicts the first, second and tenth cycle charge and discharge profiles, and corresponding dQ/dV curves of lithium cells with cathode materials having a targeted spinel content of (a) 0%, (b) 6.6%, and (c) 26.6%.
Figure 8:
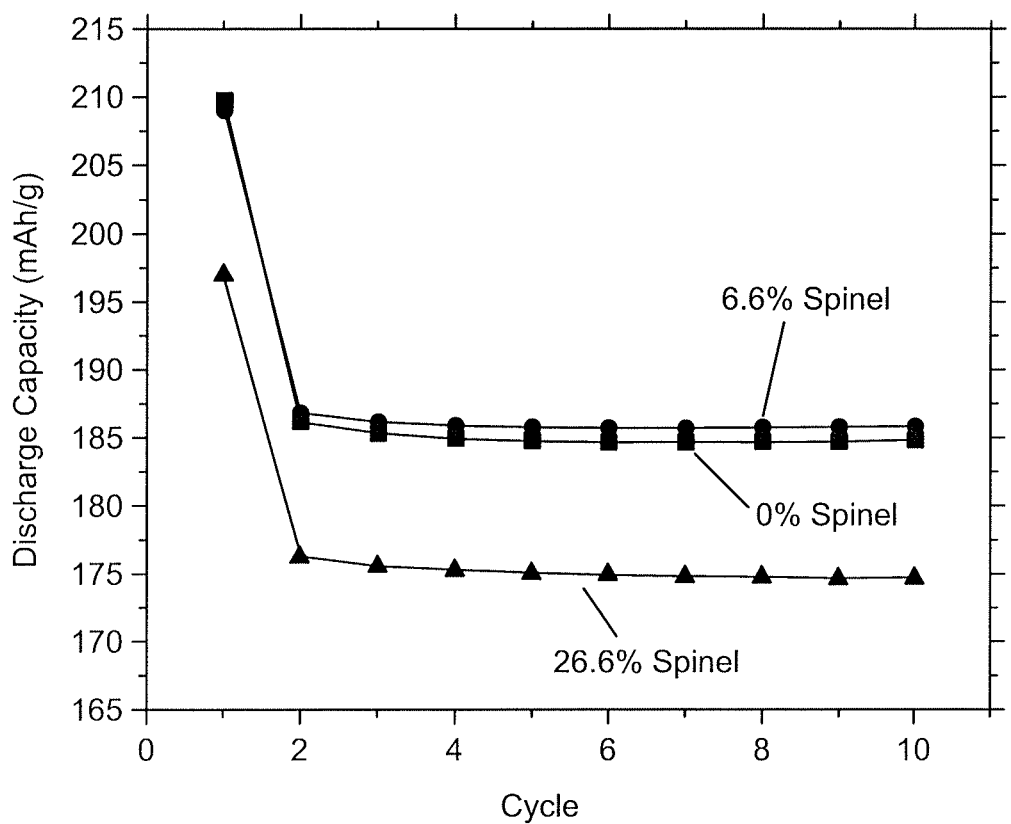
FIG. 8 depicts the capacity vs. cycle number of lithium cells with cathode materials having a targeted spinel content of (a) 0%, (b) 6.6%, and (c) 26.6% for the first ten cycles.

FIG. 7 shows the charge and discharge profiles for the first, second and tenth cycles of three lithium coins cells containing the cathode samples with targeted spinel contents of 0%, 6.6%, and 26.6%, as well the corresponding dQ/dV plots for the cells, in accordance with this invention. The first-cycle coulombic efficiency increases significantly as the spinel content increases from 77.3% to 80.1% to 89.1% for the 0%, 6.6% and 26.6% targeted spinel compositions, respectively, for the first two cycles. The 26.6% target spinel material clearly shows redox activity near about 2.6 V, typical for a spinel-like crystal environment. FIG. 8 shows the capacity vs. cycle number plots for the three cells and that the cathode with a targeted spinel content of 6.6% provided a superior capacity relative to the cathode with 0% targeted spinel, and stable cycling behavior Example 3. Acid Treatment Synthesis: Metal oxalate precursors, designated $(NiMnCo)C_2O_4$, were prepared from $NiSO_4 \cdot 6H_2O$, $MnSO_4 \cdot H_2O$, $CoSO_4 \cdot 7H_2O$, and $Na_2C_2O_4$ using the required ratios of Ni, Mn and Co for a targeted stoichiometry in the final product, $Ni_{0.28125}Mn_{0.53125}Co_{0.1875}C_2O_4 \cdot 2H_2O$. An aqueous solution containing the required amount of metal sulfates was added while stirring into a solution of sodium oxalate. The solution was then stirred for about 3 hours at about 70° C. The co-precipitated powder was filtered, washed, and dried in air at about 105° C. The dried powders were thoroughly mixed with stoichiometric amounts of lithium carbonate and annealed at about 850° C. for about 24 hours in air to prepare materials with a desired composition, $Li_{1.19375}Ni_{0.28125}Mn_{0.53125}Co_{0.1875}O_{2+\delta}$ by reducing the lithium content in a layered $0.25Li_2MnO_3 \cdot 0.75LiNi_{0.375}Mn_{0.375}Co_{0.25}O_2$ structure to target a spinel content of 7.5% in the structure, following the methodology described by Long et al, in the Journal of the Electrochemical Society, Volume 161, pages A2160-A2167 (2014) and references therein. In order to vary the lithium concentration and hence the spinel component across the particles, the powders were immersed in 0.1M nitric acid to leach lithium from surface for 24 hours at room temperature, followed by filtering, washing and drying. The dried powders were annealed at different temperatures, for example, at 400, 600 and 800° C. for 8 hours to vary the amount of spinel from the surface towards the interior of the particles.

The chemical composition of each sample was analyzed by inductive coupled plasma mass spectrometry (ICP-MS). As expected, the lithium content in the acid leached sample was lower than that in the parent electrode material, decreasing from 1.195 Li per transition metal ion (i.e., the combined Ni+Mn+Co content) to 1.114 per transition metal ion in the acid-leached sample.

Figure 9:
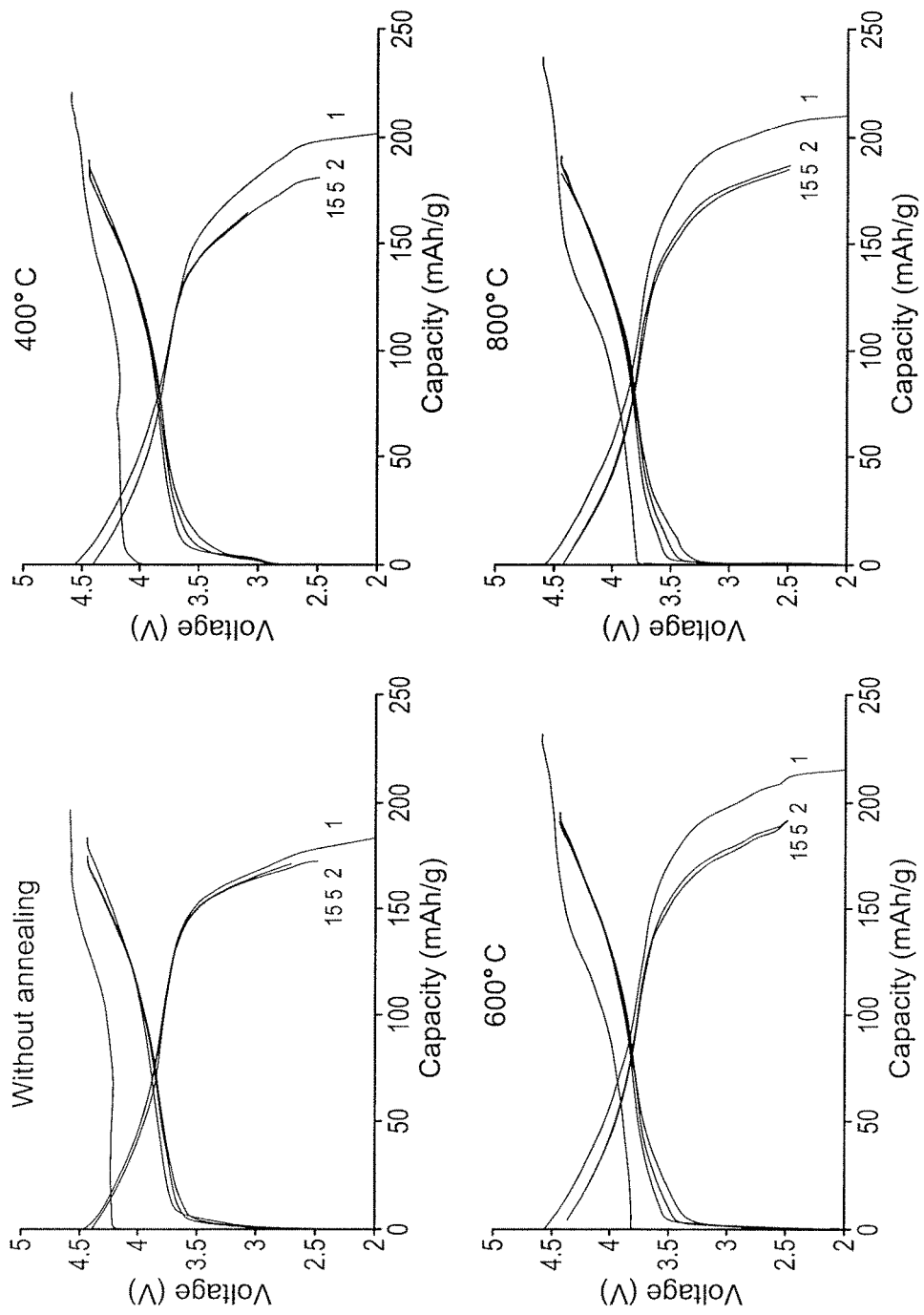
FIG. 9 depicts the voltage profiles of lithium half cells in which the cathode powders had been acid leached and subject either to no annealing, or annealing at 400, 600 and 800° C.
Figure 10:
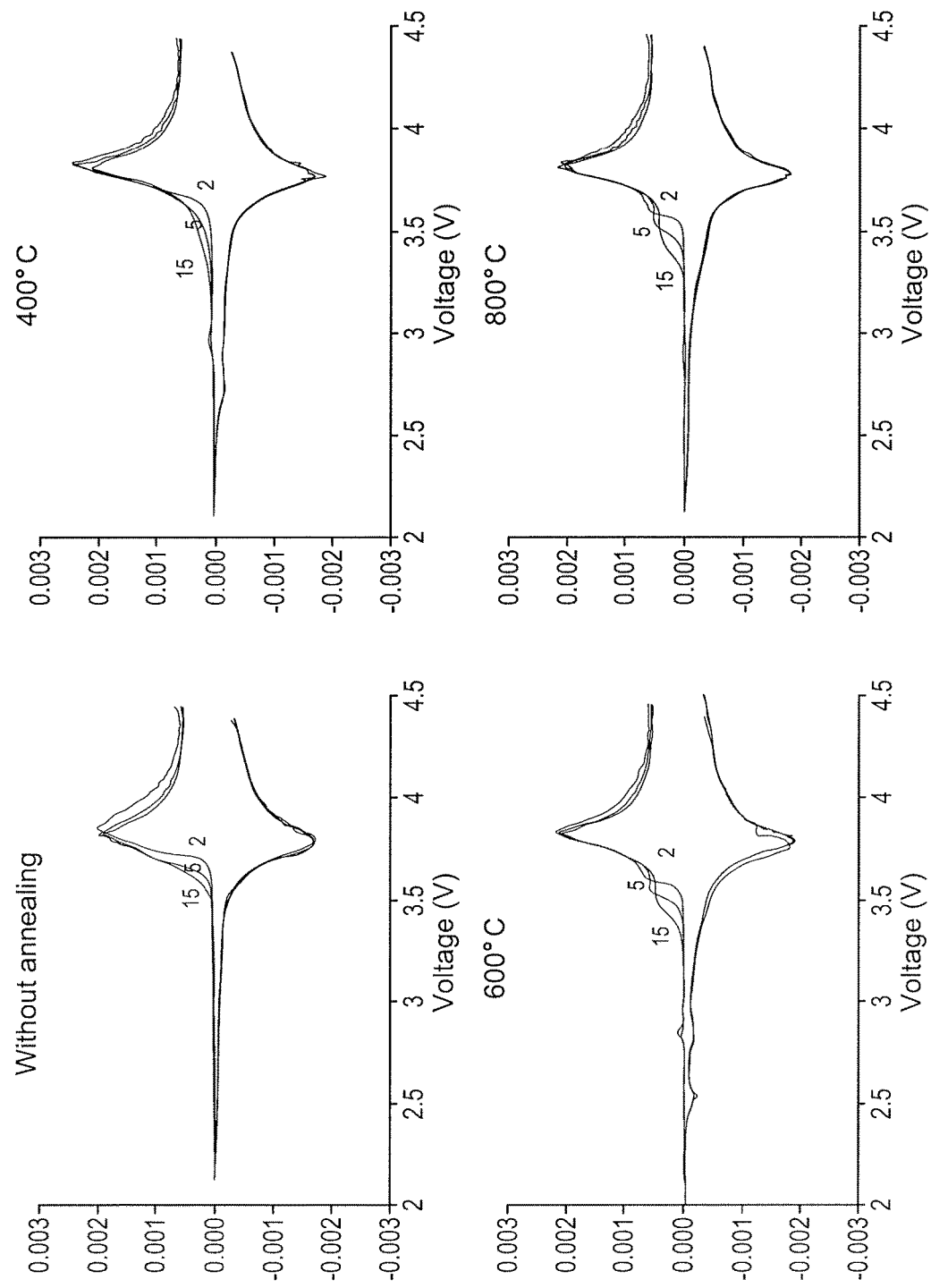
FIG. 10 depicts the corresponding dQ/dV plots of the cells in FIG. 8.

FIG. 9 and FIG. 10 show the voltage profiles and corresponding dQ/dV plots of the four lithium half cells in which the cathode powders had been acid leached and subject either to no annealing, or annealing at 400, 600 and 800° C. The cells were charged and discharged, at 15 mA/g, between 4.45 and 2.50 V after one initial activation cycle between 4.60 and 2.00 V. The electrochemical redox signatures below 3 V are characteristic of a spinel-, or spinel-like arrangement of the cations within the structure, that are most noticeable in the electrode samples heated at 400 and 600° C. The highest discharge capacity (about 190 mAh/g) and first-cycle efficiency (about 93%) were delivered by the electrode sample heated at 600° C.

The invention extends to include lithium metal oxide electrode materials (e.g., lithium-rich spinels, layered oxides, and the like) with surface modification, for example, with metal-oxide, metal-fluoride or metal-phosphate layers or coatings that do not fall within the formula $y[xLi_2MO_3 \cdot (1-x)LiM'O_2] \cdot (1-y)Li_{1+d}M''_{2-d}O_4$ to protect the electrode materials from highly oxidizing potentials in the cells and from other undesirable effects, such as electrolyte oxidation, oxygen loss, and/or dissolution. Such surface protection/modification can enhance the surface stability, rate capability and cycling stability of the electrode materials.

In some embodiments, individual particles of a powdered lithium metal oxide composition, a surface of the formed electrode, or both, are coated or treated, e.g., in situ during synthesis, for example, with a metal oxide, a metal fluoride, a metal polyanionic material, or a combination thereof, e.g., at least one material selected from the group consisting of (a) lithium fluoride, (b) aluminum fluoride, (c) a lithium-metal-oxide in which the metal is selected preferably, but not exclusively, from the group consisting of Al and Zr, (d) a lithium-metal-phosphate in which the metal is selected from the group consisting preferably, but not exclusively, of Fe, Mn, Co, and Ni, and (e) a lithium-metal-silicate in which the metal is selected from the group consisting preferably, but not exclusively, of Al and Zr. In a preferred embodiment of the invention, the constituents of the treatment or coating, such as the aluminum and fluoride ions of an $AlF_3$ coating, the lithium and phosphate ions of a lithium phosphate coating, or the lithium, nickel and phosphate ions of a lithium-nickel-phosphate coating can be incorporated in a solution that is contacted with the hydrogen-lithium-manganese-oxide material or the lithium-manganese-oxide precursor when forming the electrodes of this invention. Alternatively, the surface may be treated with fluoride ions, for example, using $NH_4F$, in which case, the fluoride ions may substitute for oxygen at the surface or at least partially within the bulk of the electrode structure.

Preferably, the compositionally and structurally inhomogeneous lithium metal oxide material of the invention, which in its initial state has the chemical composition $y[xLi_2MO_3 \cdot (1-x)LiM'O_2] \cdot (1-y)Li_{1+d}M''_{2-d}O_4$, comprises at least about 50 percent by weight (wt %) of the electrode, and an electrochemically inert polymeric binder (e.g., polyvinylidene difluoride, PVDF). Optionally, the positive electrode can comprise up to about 40 wt % carbon (e.g., carbon back, graphite, carbon nanotubes, carbon microspheres, carbon nanospheres, or any other form of particulate carbon) to enhance the electronic conductivity of the electrode.

Exemplary Electrochemical Cell and Battery.

Figure 11:
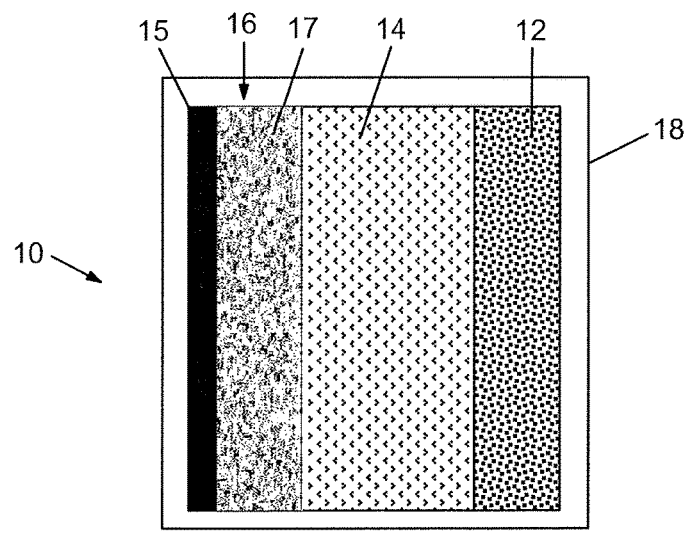
FIG. 11 depicts a schematic representation of an electrochemical cell.
Figure 12:
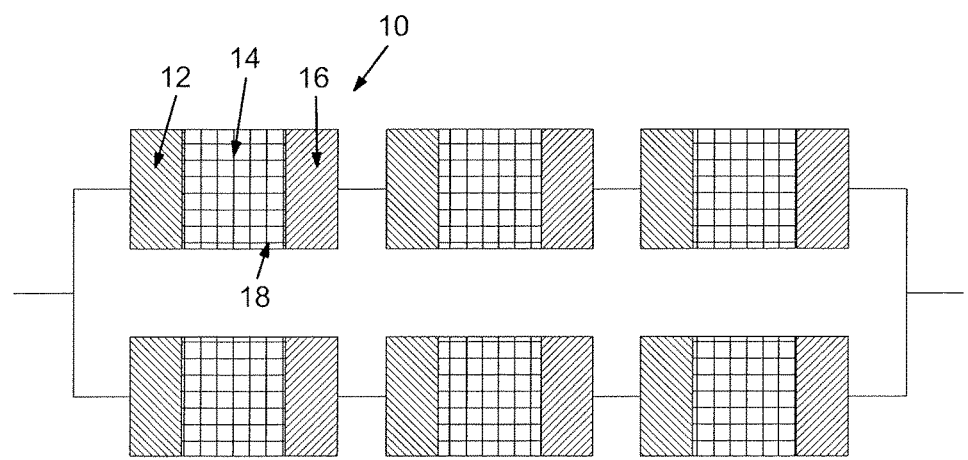
FIG. 12 depicts a schematic representation of a battery consisting of a plurality of cells connected electrically in series and in parallel.

A detailed schematic illustration of a lithium electrochemical cell 10 of the invention is shown in FIG. 11. Cell 10 comprises negative electrode 12 separated from positive electrode 16 by a separator 14 saturated with the electrolyte, all contained in insulating housing 18 with suitable terminals (not shown) being provided in electronic contact with negative electrode 12 and positive electrode 16 of the invention. Positive electrode 16 comprises metallic collector plate 15 and active layer 17 comprising the cobalt-stabilized lithium metal oxide material described herein. FIG. 12 provides a schematic illustration of one example of a battery in which two strings of electrochemical cells 10, described above, are arranged in parallel, each string comprising three cells 10 arranged in series.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A structurally inhomogeneous lithium metal oxide material of Formula (I):

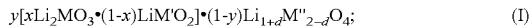

$y[xLi_2MO_3 \cdot (1-x)LiM'O_2] \cdot (1-y)Li_{1+d}M''_{2-d}O_4;$ (I)

wherein:
$0 \le x \le 1$;
$0 < y < 1$;
$0 \le d \le 0.33$;
M, M', and M'' each independently comprises one or more multivalent metal ions; and
wherein the $Li_{1+d} M''_{2-d}O_4$ component comprises a spinel structure, and each of the $Li_2MO_3$ and the $LiM'O_2$ components thereof comprise layered structures; and wherein the material of Formula (I) differs by at least one of x, y, d, M, M' and M'' from the surface to the interior across particles of the material.

2. The material of claim 1, wherein
M comprises one or more metal ions that together have a combined average oxidation state of +4;
M' comprises one or more metal ions that together have a combined average oxidation state of +3; and
M'' comprises one or more metal ions that together with the Mn and excess proportion, d, of lithium, have a combined average oxidation state of +3.5.

3. The material of claim 1, wherein particles of the material comprise a composition of Formula (I) in which $0.75 \le y < 1$.

4. The material of claim 1, wherein particles of the material comprise a composition of Formula (I) in which $0.85 \le y < 1$.

5. The material of claim 1, wherein particles of the material comprise a composition of Formula (I) in which $0.85 \le y \le 0.9$.

6. The material of claim 1, wherein particles of the material comprise a composition of Formula (I) in which each of M and M' independently comprises at least one metal selected from the group consisting of Mn, Ni, and Co; and M'' comprises at least one metal selected from the group consisting of Ni and Co.

7. The material of claim 6, wherein particles of the material comprise a composition of Formula (I) in which each of M and M' independently further comprises at least one metal selected from the group consisting of Al, Mg, Li, and a first or second row transition metal other than Mn, Ni and Co; and M'' further comprises at least one metal selected from the group consisting of Al, Mg, and a first or second row transition metal other than Mn, Ni and Co.

8. The material of claim 1, wherein particles of the material comprise a composition of Formula (I) in which $0 < d \le 0.2$; and M'' comprises Mn and at least one of Ni and Co.

9. The material of claim 1, wherein particles of the material comprise a composition of Formula (I) in which M is Mn.

10. The material of claim 1, wherein particles of the material comprise a composition of Formula (I) in which M' comprises Mn and Ni.

11. The material of claim 1, wherein particles of the material comprise a composition of Formula (I) in which M' comprises Mn, Ni, and Co.

12. The material of claim 1, wherein particles of the material comprise a composition of Formula (I) in which M'' comprises Mn, Ni, and Co.

13. The material of claim 1, wherein particles of the material comprise a composition of Formula (I) in which M is Mn; M' comprises Mn and Ni; and M'' comprises Mn, Ni, and Co.

14. The material of claim 1, wherein particles of the material comprise a composition of Formula (I) in which M'' comprises Mn and at least one metal selected from the group consisting of Ni and Co; and d>0.

15. The material of claim 1, wherein particles of the material comprise a composition of Formula (I) in which M'' comprises Mn, Ni and Co; Co constitutes about 1 atom percent to about 30 atom percent of transition metals in spinel component, $Li_{1+d}M''_{2-d}O_4$; and the combination of Mn and Ni constitutes about 70 atom percent to about 99 atom percent of the transition metals in the spinel component.

16. The material of claim 15, wherein particles of the material comprise a composition of Formula (I) in which the combination of Mn and Ni constitutes about 80 atom percent of the transition metals in the spinel component and Co constitutes about 20 atom percent of the transition metals in the spinel component, or wherein particles of the material comprise a composition of Formula (I) in which the spinel component constitutes about 50 atom percent Mn, about 30 atom percent Ni, and about 20 atom percent Co of the transition metals in the spinel component.

17. The material of claim 1, wherein particles of the material comprise a composition of Formula (I) in which the Li, M, M' and M'' cations are partially disordered over the octahedral and tetrahedral sites of the layered and spinel components of the composite lithium metal oxide structure.

18. The material of claim 1, wherein particles of the material comprise a composition of Formula (I) in which $0 \le x \le 0.5$.

19. The material of claim 1, wherein particles of the material comprise a composition of Formula (I) wherein x is 0.

20. The material of claim 1, wherein particles of the material comprise a composition of Formula (I) with intermediate layered- and spinel-type character, in which the Li, M, M' and M'' cations of the spinel and layered electrode components are partially disordered over the octahedral and tetrahedral sites of the layered and spinel components.

21. The material of claim 1, wherein particles of the material comprise a composition of Formula (I) with deviations from ideal layered and spinel compositions and structures, by inclusion of cation and anion vacancies, stacking faults, structural and/or compositional disorder, particularly at domain or grain boundaries.

22. The material of claim 1, wherein particles of the material comprise a composition of Formula (I) that includes localized rocksalt, defect rocksalt, defect spinel, and/or defect layered configurations of the transition metal ions and/or oxygen ions within the structure thereof.

23. The material of claim 1, wherein particles of the material are contacted with an acidic solution remove a portion of lithium ions from the surface of the particles to vary the lithium concentration from the surface to the interior across the particles.

24. A positive electrode for a lithium electrochemical cell comprising a layer of the electrode material of claim 1 in contact with a current collector.

25. A lithium electrochemical cell comprising the positive electrode of claim 24 and a negative electrode in contact with a non-aqueous electrolyte comprising a lithium salt.

26. A lithium battery comprising a plurality of the electrochemical cells of claim 25 connected together in series, parallel, or both.

* * * * *